United States Patent [19]

Woods

[11] Patent Number: 4,764,974
[45] Date of Patent: Aug. 16, 1988

[54] APPARATUS AND METHOD FOR PROCESSING AN IMAGE

[75] Inventor: Richard E. Woods, Knoxville, Tenn.

[73] Assignee: Perceptics Corporation, Knoxville, Tenn.

[21] Appl. No.: 910,077

[22] Filed: Sep. 22, 1986

[51] Int. Cl.$^4$ ........................ G06K 9/36; G06F 15/332
[52] U.S. Cl. ........................................ 382/43; 364/726
[58] Field of Search .................... 382/31, 43; 364/576, 364/726, 827

[56] References Cited

U.S. PATENT DOCUMENTS

| | | | |
|---|---|---|---|
| 3,573,446 | 4/1971 | Bergland | 364/726 |
| 3,617,720 | 11/1971 | Gentleman | 364/726 |
| 3,638,004 | 1/1972 | Sloane et al. | 364/726 |
| 3,702,393 | 11/1972 | Fuss | 364/726 |
| 3,704,826 | 12/1972 | Constantin | 364/726 |
| 3,783,258 | 1/1974 | Chwastyk | 364/726 |
| 3,803,391 | 4/1974 | Vernet | 364/726 |
| 3,899,667 | 8/1975 | Simone | 364/726 |
| 3,900,721 | 8/1975 | Speiser et al. | 364/726 |
| 3,965,342 | 6/1976 | Constant | 364/726 |
| 4,023,028 | 5/1977 | Dillard | 364/726 |
| 4,275,452 | 6/1981 | White | 364/726 |
| 4,328,555 | 5/1982 | Nussbaumer | 364/726 |
| 4,583,190 | 4/1986 | Salb | 364/726 |
| 4,601,006 | 7/1986 | Liu | 364/726 |

Primary Examiner—Tommy P. Chin
Assistant Examiner—Michael D. Parker
Attorney, Agent, or Firm—Luedeka, Hodges & Neely

[57] ABSTRACT

The specification discloses an apparatus and method for processing an image as part of a fast Fourier transform (FFT) operation. An image processor includes a first and second memory, each for storing the data representing an image as an array of numbers in a format having rows and columns of data positions. A controller is provided for scrolling the data in each row of the second memory with respect to the first memory by at least one data position and for outputting the data of both memories to a data processor. The data processor combines every other group of at least one number of each row of the scrolled data with a corresponding every other group of at least one number of each row of the data from the first memory and passes to its output the data from the first memory for the remaining data positions, whereby a new array of data is produced that is useful as part of a fast Fourier transform operation.

23 Claims, 1 Drawing Sheet

APPARATUS AND METHOD FOR PROCESSING AN IMAGE

FIELD OF INVENTION

The present invention relates to an apparatus and method for processing an image, and particularly relates to an image processor for taking a fast Fourier transform of an image.

BACKGROUND AND SUMMARY OF INVENTION

In image processing, it is often useful to generate a Fourier transform of an image. For example, in order to filter noise from an image, one may generate a forward Fourier transform of the image, filter the Fourier transform, and generate a reverse Fourier transform to produce an image without the noise. The advantage of performing the Fourier transform is that in the frequency domain of the Fourier transform, it may be easier to identify noise and filter it. Once the noise has been removed, the reverse Fourier transform will generate the image without the noise.

Generating a Fourier transform of an image using any type of direct implementation of the Fourier transform mathematics is a very time consuming operation even on fairly sophisticated computers. Using a fast Fourier transform (FFT) algorithm will greatly reduce the number of arithmetic operations required to generate a forward or reverse transform on a computer, but a low end general purpose computer may still require in excess of thirty minutes to an hour to perform the computation for a two dimensional image array of 512 pixels×512 pixels that is typically used in image processing. A high performance computer like a Vax/780 with substantial memory can perform the fast Fourier transform algorithm in approximately five seconds, but the cost of such computer may prove prohibitive for many applications. Thus, a need exists for an image processor utilizing a low end general purpose computer and special circuitry for generating forward and reverse Fourier transforms more rapidly. The present invention provides this specialized circuitry necessary to perform fast Fourier transform operations under the control of a general purpose computer.

In accordance with the present invention, an image processor for processing data representing an image includes specialized circuitry for operating on the data in a manner useful for performing a Fourier transform. The special circuitry of the image processor includes first and second memories, each for storing the data as an array of numbers in a format having rows and columns of data positions. Means are provided for scrolling the data in each row of the second memory with respect to the first memory by at least one data position. A data processor is provided and further means are provided for outputting the scrolled data of the second memory and the data of the first memory to the data processor. The data processor operates on the data to combine every other group of at least one number of each row of the scrolled data with a corresponding every other group of at least one number of each row of the data from the first memory and for passing to its output the data from the first memory for the remaining data positions to produce a new array of data that is useful in performing a fast Fourier transform.

In accordance with a more particular embodiment of the present invention, an image processor for performing a Fourier transform operation on data representing an image includes first and second memories and, each memory stores the data as an array of numbers having x rows and y columns. Control means in the form of a computer are provided for scrolling the data in each row of the second memory in a selected direction, forwardly or rearwardly, with respect to the first memory by a selected scroll number, n, of data positions (memory locations). The control means also generates control signals and selects the direction of scrolling and the number n of data positions by which the data is scrolled. A data processor is provided, and means are provided for outputting the data of the first memory and the scrolled data of the second memory to the data processor. The data processor operates in response to the control signals to define a data group as n numbers, to combine odd groups of n numbers in each row of data from the first memory with corresponding odd groups of n numbers in each row of the scrolled data from the second memory and to pass even groups of n numbers in each row of data from the first memory when the data in the second memory is scrolled forwardly by n data positions. The data processor is also operable to combine even groups of n numbers in each row of the data from the first memory with corresponding even groups of n numbers of scrolled data from the second memory and to pass odd groups of n numbers in each row of data from the first memory when the data is scrolled rearwardly by n data positions. The control means, preferably in the form of a small general purpose computer, is operable to cause the circulation of the data from the first and second memories to the data processor and back to the first and second memories for a series of circulation sets, where a circulation set is defined as a sufficient number of passes of the data through the data processor to combine the odd groups and pass the even groups to produce an intermediate array, store the intermediate array in the first memory and, then, to combine the even groups and pass the odd groups to produce a result array and store the result array in the first and second memories.

In the apparatus described above, the control means selects a scroll number n for each circulation set that is equal to the number "2" raised to a power of one less than the circulation set number, and the control means is further operable to circulate the data for a series of c circulation sets where two raised to the c power equals y, the number of columns of data. The more particular embodiment of the invention as described above is useful in performing a one dimensional FFT on an array of data, and by performing two one dimensional fast Fourier transforms on an array of data, a two dimensional transform may be generated.

In accordance with a particular method of the present invention, an array of data having x rows and y columns representing an image is processed as a part of a Fourier transform process using first and second memories and a data processor. The data is first reordered in accordance with a predetermined reordering sequence to produce reordered data, and the reordered data is stored in the first and second memories as an array of numbers. The data is circulated from the memories to the data processor and back to the memories for a first series of circulation sets, where the number of circulation sets in the first series equals c1 and two raised to the c1 power equals y, to produce a one dimensional fast Fourier transform array. Next, the one dimensional fast Fourier transform array is transposed by rows and columns so that the rows become columns and the columns become rows, and the data is again reordered and circulated from the memories to the data processor and back to the memories for a second series of circulation sets where the number of circulation sets in the second series equals c2 and two raised to the c2 power equals x, whereby the fast Fourier transform of the image is produced.

Each circulation set of the first and second series described above includes the steps of scrolling the data in each row of the second memory with respect to the first memory by s data positions where s equals two raised to the power of the number of the circulation set in a series of circulation sets, so that s equals one on a first circulation set, s equals two on a second circulation set, s equals four on a third circulation set and s equals two raised to the power of one less than the number of a last circulation set. The data of the first memory and the scrolled data of the second memory is then output to the data processor, and each row of the data of the first memory and the scrolled data of the second memory is grouped into alternating groups with s numbers in each group. In the data processor, every other group (defined as odd groups) of each row of the data from the first memory is combined with a corresponding group of each row of the scrolled data, and the data from the first memory is passed to the output of the data processor for the remaining data positions (the even groups) to produce an intermediate array of data. The intermediate array of data is stored in the first memory and the data in each row of the second memory is oppositely scrolled with respect to the first memory by s data positions and in an opposite direction from the previous scrolling to produce oppositely scrolled data. The intermediate array of data from the first memory and the oppositely scrolled data from the second memory is transmitted to the data processor and the data processor again groups each row of the data from the first and second memories into alternating groups with s numbers in each group. On this pass, the data processor combines the remaining every other group (the even groups) of each row of the intermediate data array, which is the data that was passed in the other combining and passing step, with a corresponding group of each row of the oppositely scrolled data and the data processor passes the data of the odd groups to its output and thereby produces a resulting array of data which is stored in the first and second memories.

In the combining steps of the above described method, the data from one of the memories is multiplied by a predetermined coefficient to produce a product and this product is added or subtracted to the data from the other memory. In a particular form of the present invention, the data processor is operable to combine the odd groups by multiplying the scrolled data by predetermined coefficients to produce products and adding the products to the data from the first memory, and the data processor is operable to combine the even groups by multiplying the data from the first memory by predetermined coefficients to produce a product and subtracting the product from the oppositely scrolled data.

In the discussion of the apparatus and method above, various operations have been performed on rows of data. For example, the data was scrolled by row and grouped by row. It will be understood, however, that the distinction between a row and a column is merely one of orientation and that all of the operations performed by row could be performed by column as well. Also, in the preferred embodiment, operations are performed on columns by first transposing the rows and columns so that the columns become rows. This transposition results in an effective and efficient method for performing operations on columns, but it will be understood that the same operations could be performed on the columns directly, without transposition.

BRIEF DESCRIPTION OF THE DRAWINGS

The present invention may best be understood by reference to the following Detailed Description of a preferred embodiment when considered in conjunction with the drawing in which.

DETAILED DESCRIPTION

Figure 1:
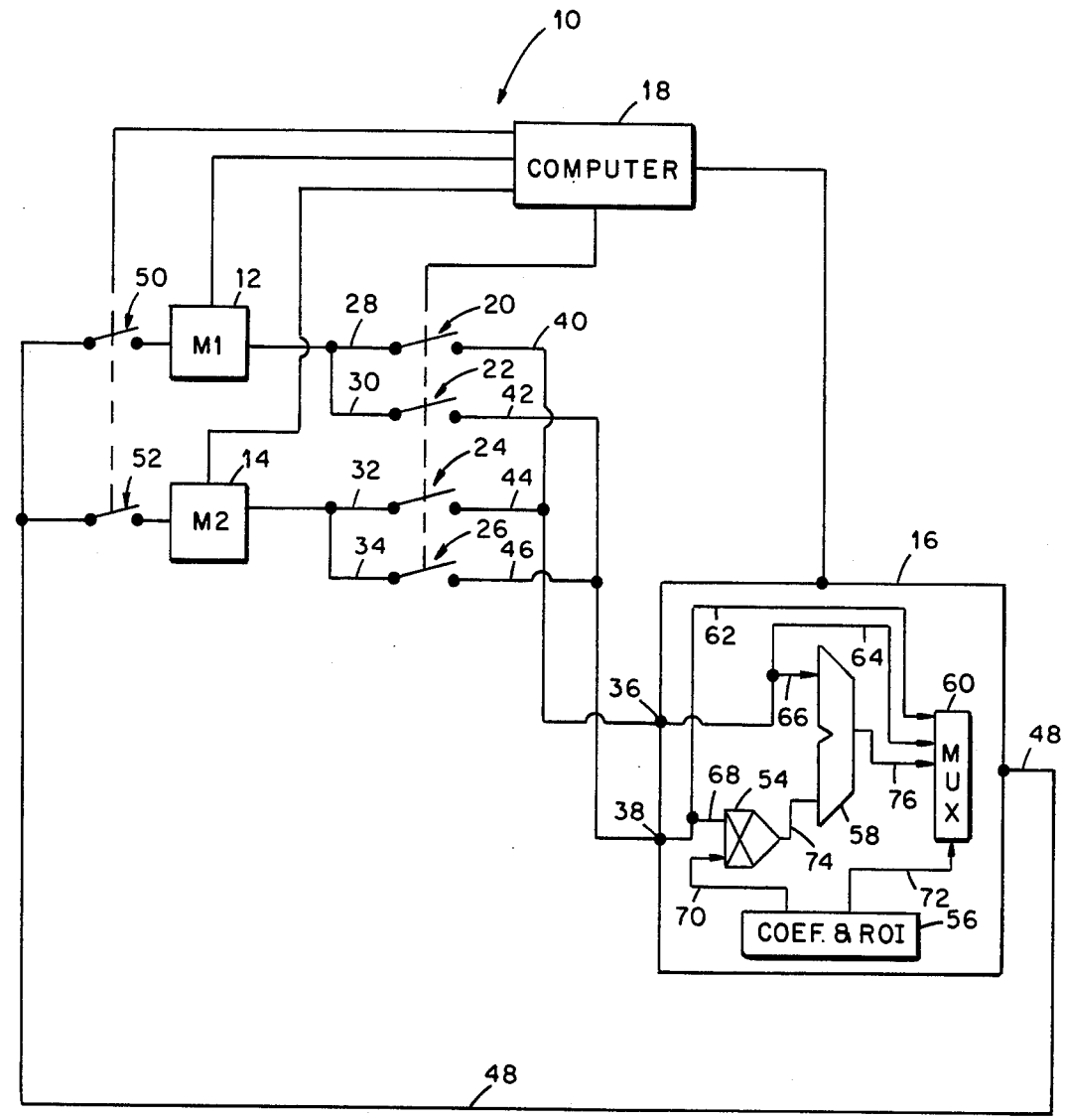
FIG. 1 is a schematic diagram of the image processor of the present invention.

Referring now to the drawings in which like reference characters designate like or corresponding parts throughout the several views, there is shown in FIG. 1 a schematic diagram of an image processor 10 which includes a first memory 12, a second memory 14, and a data processor 16 all of which are under the control of the computer 18. Four switches 20, 22, 24 and 26 are shown in FIG. 1 to represent the control of the outputs of the memories 12 and 14. Switches 20 and 22 are connected to the output of the first memory 12 by lines 28 and 30; switches 24 and 26 are connected to the output of the second memory 14 by lines 32 and 34; and all switches are individually controlled by the computer 18. The data processor 16 has two inputs 36 and 38, and lines 40, 42, 44 and 46 are connected between the switches 20, 22, 24 and 26 and the two inputs 36 and 38 so that, under the control of the computer, the outputs of either of the memories 12 and 14 may be connected to either of the inputs 36 and 38. The output of the data processor 16 is connected by line 48 through switches 50 and 52 to the inputs of the memories 12 and 14 and the switches 50 and 52 are controlled individually by the computer 18 so that the output of the data processor may be applied to either or both memories 12 and 14.

Included as part of the data processor 16 are a floating point multiplier 54, a transform coefficient look-up table (LUT) 56, a floating point arithmetic logic unit (ALU) 58 and an output multiplexer (MUX) 60. As indicated by lines 62 and 64, both of the data processor inputs 36 and 38 are connected as inputs to the MUX 60. Input 36 is also connected as an input to the ALU 58 by line 66, and line 68 connects the input 38 as an input to the multiplier 54. The other input to the multiplier 54 is supplied by the LUT 56 through line 70, and a line 72 also connects the output of the LUT 56 to the MUX 60. The output of the multiplier 54 is supplied as an input to the ALU 58 through lines 74, and the ALU output is provided as an input to the MUX 60 over line 76.

It will be understood that numerous different components may be used to form the processor 10, but in the preferred form, the Perceptics Model 9200 image processor is used with sufficient memory to hold two copies of the image. Where the numbers in a 512×512 array are twenty-four bit floating point complex numbers, each of the memories 12 and 14 require three memory modules, Perceptics Model MEM161 or HRM921, to hold the array. The data processor 16 is preferably a Perceptics FTA921, and the computer 18 is preferably a Perceptics control module CSO321 which includes a Motorola 68000 microprocessor. Although not individually represented in the Figure, the Perceptics Model 9200 normally also includes a Perceptics VSC921 which gives timing for data transfers and A/D and D/A modules for video input from a camera and output to a monitor.

In operation, the same image data is loaded into the memories 12 and 14 by the computer 18 in the form of an array of numbers in a format of x rows and y columns, and data is circulated from the memories 12 and 14 to the data processor 16 and back to the memories 12 and 14 for the purpose of manipulating the data and performing desired operations thereon with the eventual result being a fast Fourier transform of the image. The data is transferred between memories 12 and 14 and processor 16 at video rates in a raster scan format. This type of data transfer is normally used in image processors for various types of processing as well as display, and the present invention cast the FFT into a form amenable to this type of process.

One key to the efficient operation of the processor 10 is scrolling the data in the second memory 14. Under the control of the computer 18, the data in memory 14 is scrolled either forwardly or rearwardly with respect to memory 12 and then the data is simultaneously transmitted from the memories 12 and 14 to the data processor 16 where an operation is performed on the data and new data is circulated back to either or both of the memories 12 and 14. As shown in FIG. 1, the LUT 56 provides region of interest (ROI) data to the MUX 60 which controls the data that is output on line 48 for a particular pass of a particular circulation set. Thus, the MUX 60 of the data processor is controlled by the computer 18 in conjunction with the LUT 56 to either pass the data appearing on input 36 or input 38 directly to line 48 or transmit the output of the ALU 58 to line 48. One input of the ALU 58 is supplied directly by the input 36 of the data processor 16. The other input of the ALU 58 is supplied by the multiplier 54 whose inputs are the data appearing on input 38 of the data processor and a fast Fourier transform coefficient supplied by the LUT 56 which is also controlled by the computer 18. Since both inputs 36 and 38 may be connected to both memories 12 and 14, the data processor can pass data from either memory directly to the output line 48, supply data from either memory as an input to the ALU 58, or supply data from either memory as an input to the multiplier 54 which multiplies it by a coefficient selected by computer 10 and supplies the product as an input to the ALU 58. The ALU 58 either adds or subtracts its inputs and transmits the result to the MUX 60.

The principle usefulness of the processor 10 is in the performance of a fast Fourier transform (FFT), the mathematical theory of which is described in the book Digital Image Processing by Rafael C. Gonzalez and Paul Wintz, published by Addison-Wesley Publishing Company (1977) at pages 78–88. In the preferred embodiment, the processor 10 operates on a 512×512 array of numbers and it is also capable of operating on arrays ranging from 33×32 to 1024×1024. But for illustration purposes, the operation of the processor 10 will be explained with regard to a smaller 4×4 array. The data representing an image is in the form of an array of numbers $a_{xy}$ where a is a magnitude value, x is the row in which a is located and y is the column in which a is located as shown in Table 1 below.

TABLE 1

| $a_{11}$ | $a_{12}$ | $a_{13}$ | $a_{14}$ |
| $a_{21}$ | $a_{22}$ | $a_{23}$ | $a_{24}$ |

TABLE 1-continued

| $a_{31}$ | $a_{32}$ | $a_{33}$ | $a_{34}$ |
| $a_{41}$ | $a_{42}$ | $a_{43}$ | $a_{44}$ |

To begin the FFT, the data as shown in Table 1 is stored in one of the memories, such as memory 12, for example. Then, the rows and columns are transposed so that the columns become rows and the rows become columns as shown in Table 2 below. This is accomplished by reading the data out of memory 12 and storing it in the desired location in memory 14 and then copying memory 14 into the memory 12.

TABLE 2

| $a_{11}$ | $a_{21}$ | $a_{31}$ | $a_{41}$ |
| $a_{12}$ | $a_{22}$ | $a_{32}$ | $a_{42}$ |
| $a_{13}$ | $a_{23}$ | $a_{33}$ | $a_{43}$ |
| $a_{14}$ | $a_{24}$ | $a_{34}$ | $a_{44}$ |

For clarity of illustration, the array of Table 2 is now redefined using $b_{xy}$ to designate positions in the array as shown in Table 2. Thus, $b_{11}$ equals $a_{11}$; $b_{12}$ equals $a_{21}$; $b_{13}$ equals $a_{31}$; $b_{14}$ equals $a_{41}$; $b_{21}$ equals $a_{12}$; $b_{22}$ equals $a_{22}$; $b_{23}$ equals $a_{32}$; . . . ; $b_{44}$ equals $a_{44}$. Using the new symbol b, Table 2 would appear as shown in Table 3 below:

TABLE 3

| $b_{11}$ | $b_{12}$ | $b_{13}$ | $b_{14}$ |
| $b_{21}$ | $b_{22}$ | $b_{23}$ | $b_{24}$ |
| $b_{31}$ | $b_{32}$ | $b_{33}$ | $b_{34}$ |
| $b_{41}$ | $b_{42}$ | $b_{43}$ | $b_{44}$ |

The data as shown in Table 3 now appears in both memories 12 and 14. To continue the FFT, the rows are reordered according to a binary bit reversal sequence in which the binary position of the data bit is reversed to determine the new location on the data. In the 4×4 array example, the four positions in the row are 00, 01, 10, 11 and the bit reversed binary numbers are 00, 10, 01, 11. Thus, row 1 would be reordered as follows: $b_{11}$, $b_{13}$, $b_{12}$, $b_{14}$, and the reordered array is shown in Table 4. This reordering is accomplished by reading the data out of one memory, such as memory 12, and into the desired location in the other memory, memory 14, and copying memory 14 into memory 12. In actuality, the above described transposing and reordering steps are done as one step.

TABLE 4

| $b_{11}$ | $b_{13}$ | $b_{12}$ | $b_{14}$ |
| $b_{21}$ | $b_{23}$ | $b_{22}$ | $b_{24}$ |
| $b_{31}$ | $b_{33}$ | $b_{32}$ | $b_{34}$ |
| $b_{41}$ | $b_{43}$ | $b_{42}$ | $b_{44}$ |

With the reordered data of Table 4, the second memory 14 is scrolled forwardly for one data position with respect to memory 12, and the data is simultaneously read out of the memories 12 and 14 to the data processor 16. The data from the forwardly scrolled second memory 14 appears ordered as shown in Table 5 below:

TABLE 5

| $b_{13}$ | $b_{12}$ | $b_{14}$ | $b_{11}$ |
| $b_{23}$ | $b_{22}$ | $b_{24}$ | $b_{21}$ |
| $b_{33}$ | $b_{32}$ | $b_{34}$ | $b_{31}$ |
| $b_{43}$ | $b_{42}$ | $b_{44}$ | $b_{41}$ |

In the first pass of the first circulation set, the data from the first memory 12 is connected to input 36 and the data from the second memory 14 is connected to input 38. This may be diagrammatically represented by closing switches 20 and 26 and opening switches 22 and 24. The data (numbers in the array) is grouped by one's and for each row the odd groups of data from the first memory 12 (Table 4) are combined with the odd groups of data from the second memory 14. The combining of odd groups as mentioned above included looking up the proper FFT coefficient $c_{xy}$ in LUT 56, multiplying the data from the second memory by $c_{xy}$ to produce a product and adding it to the data from the first memory 12. The even groups of data from the first memory 12 are also passed by the data processor directly to the output appearing on line 48. Thus, the output of the data processor 16 on the first pass of the first circulation set appears as shown in Table 6 and this new array of data is stored in the first memory 12 while the second memory 14 is not changed.

TABLE 6

| $(b_{11} + c_{11}b_{13})$ | $b_{13}$ | $(b_{12} + c_{13}b_{14})$ | $b_{14}$ |
|---|---|---|---|
| $(b_{21} + c_{21}b_{23})$ | $b_{23}$ | $(b_{22} + c_{23}b_{24})$ | $b_{24}$ |
| $(b_{31} + c_{31}b_{33})$ | $b_{33}$ | $(b_{32} + c_{33}b_{34})$ | $b_{34}$ |
| $(b_{41} + c_{41}b_{43})$ | $b_{43}$ | $(b_{42} + c_{43}b_{44})$ | $b_{44}$ |

To begin the second pass of the first circulation set, the data in the second memory 14 is scrolled rearwardly one data position with respect to the first memory 12 and the data of both memories is read out to the data processor 16. The rearwardly scrolled data would appear as shown in Table 7 when read from the second memory 14 and the data from the first memory 12 would appear as shown in Table 6.

TABLE 7

| $b_{14}$ | $b_{11}$ | $b_{13}$ | $b_{12}$ |
|---|---|---|---|
| $b_{24}$ | $b_{21}$ | $b_{23}$ | $b_{22}$ |
| $b_{34}$ | $b_{31}$ | $b_{33}$ | $b_{32}$ |
| $b_{44}$ | $b_{41}$ | $b_{43}$ | $b_{42}$ |

During the second pass switches 22 and 24 are closed and switches 28 and 34 are open so that the first memory 12 is connected to the input 38 and the second memory 14 is connected to the input 36. The data from both memories 12 and 14 are again grouped by row by one's and this time the odd groups of each row of the data from the first memory 12 are passed by the data processor to the output appearing on line 48. For even groups, the data from the first memory 12 is multiplied by a selected coefficient $c_{xy}$ and the product is subtracted from the corresponding group of data from the second memory appearing at input 36. Thus, the output of the data processor on the second pass of the first circulation set is shown in Table 8 which is then stored in both memories 12 and 14 and is the result array of the first circulation set.

TABLE 8

| $(b_{11} + c_{11}b_{13})$ | $(b_{11} - c_{12}b_{13})$ | $(b_{12} + c_{13}b_{14})$ | $(b_{12} - c_{14}b_{14})$ |
|---|---|---|---|
| $(b_{21} + c_{21}b_{23})$ | $(b_{21} - c_{22}b_{23})$ | $(b_{22} + c_{23}b_{24})$ | $(b_{22} - c_{24}b_{24})$ |
| $(b_{31} + c_{31}b_{33})$ | $(b_{31} - c_{32}b_{33})$ | $(b_{32} + c_{33}b_{34})$ | $(b_{32} - c_{34}b_{34})$ |
| $(b_{41} + c_{31}b_{43})$ | $(b_{41} - c_{42}b_{43})$ | $(b_{42} + c_{43}b_{44})$ | $(b_{42} - c_{44}b_{44})$ |

To make the tables more understandable, the values shown in Table 8 will be replaced by $d_{xy}$ where x and y indicate actual positions. Thus, Table 8 may be represented as shown in Table 9.

TABLE 9

| $d_{11}$ | $d_{12}$ | $d_{13}$ | $d_{14}$ |
|---|---|---|---|
| $d_{21}$ | $d_{22}$ | $d_{23}$ | $d_{24}$ |
| $d_{31}$ | $d_{32}$ | $d_{33}$ | $d_{34}$ |
| $d_{41}$ | $d_{42}$ | $d_{43}$ | $d_{44}$ |

The next step in the operation is to scroll the new data in the second memory 14 forwardly two data positions with respect to memory 12 so that the data from memory 14 will appear as shown in Table 10 when it is transmitted to the data processor 16.

TABLE 10

| $d_{13}$ | $d_{14}$ | $d_{11}$ | $d_{12}$ |
|---|---|---|---|
| $d_{23}$ | $d_{24}$ | $d_{21}$ | $d_{22}$ |
| $d_{33}$ | $d_{34}$ | $d_{31}$ | $d_{32}$ |
| $d_{43}$ | $d_{44}$ | $d_{41}$ | $d_{42}$ |

Switches 20 and 26 are closed, and on the second circulation set, the numbers of each row are grouped by two's. On the first pass, the numbers of the odd groups are combined in the same manner as on the first pass except with new coefficients $c_{xy}$ and the numbers of the even groups from the first memory are passed to the output appearing on line 48. The output of the data processor is shown in Table 11 and this data is stored in the first memory after the first pass.

TABLE 11

| $(d_{11} + c_{11}d_{13})$ | $(d_{12} + c_{12}d_{14})$ | $d_{13}$ | $d_{14}$ |
|---|---|---|---|
| $(d_{21} + c_{21}d_{23})$ | $(d_{22} + c_{22}d_{24})$ | $d_{23}$ | $d_{24}$ |
| $(d_{31} + c_{31}d_{33})$ | $(d_{32} + c_{32}d_{34})$ | $d_{33}$ | $d_{34}$ |
| $(d_{41} + c_{41}d_{43})$ | $(d_{42} + c_{42}d_{44})$ | $d_{43}$ | $d_{44}$ |

On the next pass of the second circulation set, the data in the second memory 14 is scrolled rearwardly two data positions with respect to memory 12. Also the first memory 12 is connected to input 38 and the second memory 14 is connected to the input 36. The odd groups of two numbers each per row from the first memory 12 are passed to the output of the data processor 16, while the even groups of two numbers of each row are combined in the manner of the second pass of the first circulation set, except with different coefficients $c_{xy}$. Thus, the output of the data processor after the second pass is shown in Table 12 below and the resulting array of values is stored in both memories 12 and 14.

TABLE 12

| $(d_{11} + c_{11}d_{13})$ | $(d_{12} + c_{12}d_{14})$ | $(d_{11} - c_{13}d_{13})$ | $(d_{12} - c_{14}d_{14})$ |
|---|---|---|---|
| $(d_{21} + c_{21}d_{23})$ | $(d_{22} + c_{22}d_{24})$ | $(d_{21} - c_{23}d_{23})$ | $(d_{22} - c_{24}d_{24})$ |
| $(d_{31} + c_{31}d_{33})$ | $(d_{32} + c_{32}d_{34})$ | $(d_{31} - c_{33}d_{33})$ | $(d_{32} - c_{34}d_{34})$ |
| $(d_{41} + c_{41}d_{43})$ | $(d_{42} + c_{42}d_{44})$ | $(d_{41} - c_{43}d_{43})$ | $(d_{42} - c_{44}d_{44})$ |

After the data of Table 12 is stored in memories 12 and 14, the second circulation set is complete and the FFT is complete as to the rows. Generalizing the process described above, in order to perform an FFT on the rows of data in an array where each row contains y numbers, the data must be circulated as described above for c circulation sets where $2^c = y$. In each circulation set, the numbers in a row must be grouped, and the size (count of numbers) in a group equals two raised to a power of one less than the number of the particular circulation set. For example, as noted in the above discussion with respect to a 4×4 array, the numbers of each row were first grouped by one on the first circulation set which equals two raised to the power of one less than the circulation set number of one which equals $2^0-1$. On the second circulation set, the numbers of each row were grouped by two's which equals two raised to the power of one less than the circulation set number of two which equals $2^1=2$. On a larger array, such as an $8\times 8$ array, a third circulation set would be necessary and the numbers of each row would be grouped by fours, the number four being determined by raising two to a power of one less than the circulation set number of three which equals $2^2=4$.

In the above discussion regarding the $4\times 4$ array, the FFT has been performed on the rows only. In order to complete the FFT on the entire image, it is necessary to perform the FFT on the columns as well. To do this, the columns are transposed to become rows and the exact same FFT process is performed on the rows again. When the process is complete, the resulting data array will be the complete FFT of the image. It will be recalled that the rows and columns were transposed at the beginning of the processing before the first circulation set was begun. Thus, in this particular embodiment, the columns were actually transformed first. Then, after this transformation, the rows and columns are again transposed and, after the next transformation, the FFT of the image is complete and is in an orientation coreponding to the original image. If the rows and columns had not been initially transposed, it would have been necessary to transpose the rows and columns after the FFT on the image was complete to correct the orientation of the FFT. Of course, an FFT in the "wrong" orientation is also a useful end result and, if desired, it is not necessary to reorient the FFT of the image by performing two column and row transpositions.

The process of completing the transform of the image after the data of Table 12 is created is described below. Since this process is essentially identical to the previously described process of performing a transform on the rows, the discussion will be less detailed. First, to simplify the array shown in Table 12, the value $e_{xy}$ will be assigned to the values in Table 12, where x and y indicate actual row and column positions. Thus, Table 12 becomes Table 13 shown below.

TABLE 13

| | | | |
|---|---|---|---|
| $e_{11}$ | $e_{12}$ | $e_{13}$ | $e_{14}$ |
| $e_{21}$ | $e_{22}$ | $e_{23}$ | $e_{24}$ |
| $e_{31}$ | $e_{32}$ | $e_{33}$ | $e_{34}$ |
| $e_{41}$ | $e_{42}$ | $e_{43}$ | $e_{44}$ |

The data shown in Table 13 is then transposed, column for row, to achieve the data shown in Table 14.

TABLE 14

| | | | |
|---|---|---|---|
| $e_{11}$ | $e_{21}$ | $e_{31}$ | $e_{41}$ |
| $e_{12}$ | $e_{22}$ | $e_{32}$ | $e_{42}$ |
| $e_{13}$ | $e_{23}$ | $e_{33}$ | $e_{43}$ |
| $e_{14}$ | $e_{24}$ | $e_{34}$ | $e_{44}$ |

For clarity of discussion, the values of Table 14 are now redefined using $f_{xy}$ and Table 14 becomes Table 15 as shown below.

TABLE 15

| | | | |
|---|---|---|---|
| $f_{11}$ | $f_{12}$ | $f_{13}$ | $f_{14}$ |
| $f_{21}$ | $f_{22}$ | $f_{23}$ | $f_{24}$ |
| $f_{31}$ | $f_{32}$ | $f_{33}$ | $f_{34}$ |
| $f_{41}$ | $f_{42}$ | $f_{43}$ | $f_{44}$ |

Next, the data is reordered using the binary bit reversal sequence and is passed through the data processor twice to complete the first circulation set. The resulting array produced after the first circulation set is shown in Table 16.

TABLE 16

| | | | |
|---|---|---|---|
| $(f_{11} + c_{11}f_{13})$ | $(f_{11} - c_{12}f_{13})$ | $(f_{12} + c_{13}f_{14})$ | $(f_{12} - c_{14}f_{14})$ |
| $(f_{21} + c_{21}f_{23})$ | $(f_{21} - c_{22}f_{23})$ | $(f_{22} + c_{23}f_{24})$ | $(f_{22} - c_{24}f_{24})$ |
| $(f_{31} + c_{31}f_{33})$ | $(f_{31} - c_{32}f_{33})$ | $(f_{32} + c_{33}f_{34})$ | $(f_{32} - c_{34}f_{34})$ |
| $(f_{41} + c_{31}f_{43})$ | $(f_{41} - c_{42}f_{43})$ | $(f_{42} + c_{43}f_{14})$ | $(f_{42} - c_{44}f_{44})$ |

Again, for clarity of illustration, the values of Table 16 are reassigned values of $g_{xy}$ and Table 16 becomes Table 17 as shown below.

TABLE 17

| | | | |
|---|---|---|---|
| $g_{11}$ | $g_{12}$ | $g_{13}$ | $g_{14}$ |
| $g_{21}$ | $g_{22}$ | $g_{23}$ | $g_{24}$ |
| $g_{31}$ | $g_{32}$ | $g_{33}$ | $g_{34}$ |
| $g_{41}$ | $g_{42}$ | $g_{43}$ | $g_{44}$ |

Next, the data of Table 17 is passed through the data processor 16 twice in a second circulation set as described above and the resulting array is shown in Table 18 which is the completed FFT of the image.

TABLE 18

| | | | |
|---|---|---|---|
| $(g_{11} + c_{11}g_{13})$ | $(g_{12} + c_{12}g_{14})$ | $(g_{11} - c_{13}g_{13})$ | $(g_{12} - c_{14}g_{14})$ |
| $(g_{21} + c_{21}g_{23})$ | $(g_{22} + c_{22}g_{24})$ | $(g_{21} - c_{23}g_{23})$ | $(g_{22} - c_{24}g_{24})$ |
| $(g_{31} + c_{31}g_{33})$ | $(g_{32} + c_{32}g_{34})$ | $(g_{31} - c_{33}g_{33})$ | $(g_{32} - c_{34}g_{34})$ |
| $(g_{41} + c_{41}g_{43})$ | $(g_{42} + c_{42}g_{44})$ | $(g_{41} - c_{43}g_{43})$ | $(g_{42} - c_{44}g_{44})$ |

As mentioned above, the preferred embodiment uses a $512\times 512$ pixel array of data. 512 is two raised to the ninth power which means that nine circulation sets are necessary in order to complete the transform of the rows and then nine more circulation sets are necessary to complete the transforms of the columns. In the first circulation set, the second memory is scrolled forwardly and rearwardly by one data position and the data is grouped by one in exactly the same manner as described with respect to the $4\times 4$ array. Likewise, in the second circulation set, the data is shifted forwardly, then rearwardly, by two data positions and the data is grouped by two, similarly to the operation shown with regard to the $4\times 4$ array. In the third circulation set, the data is shifted forwardly and rearwardly by two raised to the second power (4) and the data is grouped by fours. In the fourth circulation set, the data is shifted by two raised to the third power (8) and the data is grouped by eights. In the last circulation set, the ninth circulation set, the data is shifted by two raised to the eighth power (256) and the data is grouped into two groups of 256 numbers each. In the above example, each scroll is shown as a wrap around scroll. For example, in the array shown in Table 10, the data was shifted forward two places and the data originally appearing in columns one and two wrapped around to columns three and four. This wrap around is not really necessary for purposes of the FFT because the data that wraps around is not used. Thus, it will be understood that the term "scroll" as used herein does not imply wrap around functions.

During the transformation process, the data is multiplied by coefficients that are loaded into the LUT 56. In actual practice, these coefficients are simply stored values that have been previously determined using standard FFT mathematics.

In the examples given above, a different symbol was used for each coefficient in a column. For example, $C_{11}$ was the coefficient for row one, column one, and $C_{21}$ was the coefficient for row 2, column one. In practice, all coefficients in a column are equal, and it is necessary to determine only the different coefficients along the rows. ($C_{11}=C_{21}=C_{x1}$) The formula for determining the coefficients across a row is given by $$C_y = \cos\left[\frac{2\pi(y-1)}{2^p}\right] - j\sin\left[\frac{2\pi(y-1)}{2^p}\right]$$

for $y = 1, 2, \ldots 2^{p-1}$
where
p = the circulation number
y = the column number
The coefficients repeat across the row $$\left[\frac{N}{2^p - 1}\right]$$

times were N = the total number of columns.

For example, for the second circulation set for an 8×8 array:

$$C_1 = \cos\left[\frac{2\pi(1-1)}{2^2}\right] - j\sin\left[\frac{2\pi(1-1)}{2^2}\right] = 1$$

$$C_2 = \cos\left[\frac{2\pi(2-1)}{2^2}\right] - j\sin\left[\frac{2\pi(2-1)}{2^2}\right] = -j$$

repeated $\left[\frac{8}{2^2 - 1}\right]$ times = 4 times

Thus, the coefficients across the row are:

1, −j, 1, −j, 1, −j, 1, −j

In the above discussion, the term number is used in its broad sense and would include complex numbers. Thus, when the discussion refers to the memory location or the data position of a particular number, even though the location may be referred to in a singular tense, it will be understood that the actual memory location for the number may be two or more memory locations. For example, typically the real and imaginary parts of a number are stored in two different corresponding memory locations. However, for the purposes of the discussion above, the multiple memory locations in which one number is located will be considered a single memory location for the purpose of understanding the above discussion.

Although a particular embodiment has been described above, this description should not be interpreted as a limitation and it will be understood that the invention is capable of numerous modifications, alterations or substitutions of parts without departing from the scope of the invention as defined by the claims.

What is claimed is:

1. An image processor for processing data representing an image, comprising:
   a first memory for storing the data as an array of numbers in a format having rows and columns of data positions;
   a second memory for storing the data as an array of numbers in a format having rows and columns of data positions;
   means for scrolling the data in each row of the second memory with respect to the first memory by at least one data position;
   a data processor;
   means for outputting the scrolled data of the second memory and the data of the first memory to the data processor; and
   said data processor being operable to combine every other group of at least one number of each row of the scrolled data with a corresponding every other group of at least one number of each row of the data from the first memory and for passing the data from the first memory for the remaining data positions to produce a new array of data.

2. The image processor of claim 1 further comprising means for reordering the data stored in the first and second memories in accordance with a predetermined reordering sequence prior to scrolling or outputting the data.

3. The image processor of claim 1 further comprising:
   means for supplying a set of coefficients;
   means for selecting data from the first or second memories; and
   means for multiplying every other number of the selected data by a selected one of the coefficients prior to combining the scrolled data and the data of the first memory.

4. The image processor of claim 1 wherein said means for combining comprises means for adding and subtracting.

5. The image processor of claim 1 wherein said groups contain only one number.

6. The image processor of claim 1 wherein said groups contain a count of numbers equal to a power of two.

7. The image processor of claim 1 wherein said means for scrolling is operable to selectively scroll the data in each row of the second memory forwardly and rearwardly with respect to the first memory by a selected number of data positions; and
   said data processor is operable to combine the odd groups of each row of the scrolled data with the corresponding odd groups of each row of the data from the first memory when the data is scrolled forwardly and is operable to combine the even groups in each row of the scrolled data with the corresponding even groups of the data from the first memory when the data is scrolled rearwardly.

8. The image processor of claim 7 wherein the count of numbers in each group is equal to the selected number of data positions by which the data of the second memory is scrolled forwardly or rearwardly.

9. An image processor for performing a Fourier transform operation on data representing an image comprising:
   a first memory for storing the data as an array of numbers in a format having x rows and y columns;
   a second memory for storing the data as an array of numbers in a format having x rows and y columns;
   means for scrolling the data in each row of the second memory in a selected direction, forwardly or rearwardly, with respect to the first memory by a selected scroll number, n, of data positions;

control means for generating control signals and for selecting the direction of scrolling and the number n of data positions by which the data is scrolled;

a data processor;

means for outputting the data of the first memory and the scrolled data of the second memory to the data processor;

said data processor being operable in response to the control signals to define a data group as n numbers, to combine odd groups of n numbers in each row of data from the first memory with corresponding odd groups of n numbers in each row of the scrolled data from the second memory and to pass even groups of n numbers in each row of data from the first memory when the data in said second memory is scrolled forwardly by n data positions and being operable to combine even groups of n numbers in each row of data from the first memory with corresponding even groups of n numbers of scrolled data from the second memory and to pass odd groups of n numbers in each row of data from the first memory when said data is scrolled rearwardly by n data positions; and said control means being operable to cause the circulation of the data from said first and second memories to the data processor and back to the first and second memories for a series of circulation sets, where a circulation set is defined as a sufficient number of passes of the data through the data processor to combine the odd groups and pass the even groups to produce an intermediate array, store the intermediate array in a first memory and, then, to combine the even groups and pass the odd groups to produce a result array and store the result array in the first and second memories.

10. The processor of claim 9 further comprising said control means being operable to select said scroll number n for each circulation set to be equal to the number "2" raised to a power of one less than the circulation set number so that n=1 on the first circulation set, n=2 on the secod circulation set, n=4 on the third circulation set, n=8 on the fourth circulation set and n=2 raised to the number of the last circulation set minus 1 for the last circulation set.

11. The processor of claim 9 further comprising said control means being operable to circulate the data for a series of c circulation sets where two raised to the c power equals y, the number of columns of data.

12. The processor of claim 9 further comprising said control means being operable to circulate the data for a series of c number of circulation sets where 2 raised to the c power equals x, the number of rows of data.

13. The processor of claim 9 further comprising said data processor being operable in response to the control signals to reorder the data in accordance with a predetermined reordering sequence.

14. The processor of claim 9 further comprising said data processor being operable in response to the control signals to reorder the data by transposing the rows and columns so that each column becomes a row with the first column becoming the first row, the second column becoming the second row, and the last column becoming the last row.

15. The processor of claim 9 further comprising said data processor being operable to combine the odd groups by multiplying the scrolled data by predetermined coefficients to produce products and adding the products to the data from the first memory.

16. The processor of claim 9 further comprising said data processor being operable to combine the even groups by multiplying the data from the first memory by predetermined coefficients to produce a product and subtracting the product from the oppositely scrolled data.

17. A method for processing data representing an image using first and second memories and a data processor, comprising:

storing the image in each memory by storing the data in the first and second memories as an array of numbers in a format having rows and columns of data positions;

scrolling the data in each row of the second memory with respect to the first memory by at least one data position to produce scrolled data;

outputting the data of the first memory and the scrolled data of the second memory to the data processor;

grouping each row of data into groups of at least one number; and combining every other group (defined as the odd groups) of each row of the data from the first memory with a corresponding group of each row of the scrolled data and passing the data from the first memory for the remaining data positions (the even groups) to produce a new array of data.

18. The method of claim 17 further comprising:

storing the new array of data in the first memory;

oppositely scrolling the data in each row of the second memory with respect to the first memory by at least one data position and in an opposite direction from the previous scrolling to produce oppositely scrolled data;

outputting the new array of data and the oppositely scrolled data from the first and second memories to the data processor;

grouping each row of the new array of data and the oppositely scrolled data into groups of numbers of the same size as the groups produced by the other grouping; and combining the even groups of each row of the new data array, which is the data that was passed in the other combining and passing step, with a corresponding group of each row of the oppositely scrolled data and passing the data from the first memory for the remaining data positions (the odd groups) to produce a resulting array of data.

19. The method of claim 17 further comprising reordering the data in accordance with a predetermined reordering sequence for each row of data prior to initially storing the data in the first and second memories.

20. A method for processing an array of data having x rows and y columns representing an image as part of a fast Fourier transform process using first and second memories and a data processor, comprising:

reordering the data in accordance with a predetermined reordering sequence to produce reordered data;

storing the reordered data in first and second memories as an array of numbers in a format having x rows and y columns where x and y are both powers of two, each of said first and second memories containing all of the reordered data corresponding to the image;

circulating the data from the memories to the data processor and back to the memories for a first series of circulation sets where the number of circulation sets in the first series equals c1 and two raised to the c1 power equals y to produce a one dimensional FFT array;

transposing the one dimensional FFT array by rows and columns so that the rows become columns and the columns become rows;

reordering the data again in accordance with a predetermined reordering sequence to produce second reordered data and storing the second reordered data in the first and second memories;

circulating the second reordered data again from the memories to the data processor and back to the memories for a second series of circulation sets where the number of circulation sets in the second series equals c2 and two raised to the c2 power equals x, whereby the fast fourier transform of the image is produced;

each circulation set of the first and second series comprising:

scrolling the data in each row of the second memory with respect to the first memory by s data positions where s equals 2 raised to the power of the number of the circulation set in a series of circulation sets, so that s equals one on a first circulation set, s equals two on a second circulation set, s equals four on a third circulation set and, on the last circulation set, s equals two raised to the power of one less than the number of a last circulation set;

outputting the data of the first memory and the scrolled data of the second memory to the data processor;

grouping each row of the data of the first memory and the scrolled data of the second memory into alternating groups with s numbers in each group;

combining every other group (defined as the odd groups) of each row of the data from the first memory with a corresponding group of each row of the scrolled data and passing the data from the first memory for the remaining data positions (the even groups) to produce an intermediate array of data;

storing the intermediate array of data in the first memory;

oppositely scrolling the data in each row of the second memory with respect to the first memory by s data positions and in an opposite direction from the previous scrolling to produce oppositely scrolled data;

outputting the intermediate array of data from the first memory and the oppositely scrolled data from the second memory to the data processor;

grouping in the data processor each row of the data from the first and second memories into alternating groups with s numbers in each group;

combining the remaining every other group (the even groups) of each row of the intermediate data array, which is the data that was passed in the other combining and passing step, with a corresponding group of each row of the oppositely scrolled data and passing the data of the odd groups to produce a resulting array of data.

21. The method of claim 20 wherein said reordering step comprises reordering the data of each row according to a binary bit reversal reordering sequence.

22. The method of claim 20 wherein said reordering step includes transposing the rows and columns so that the rows become columns and the columns become rows.

23. The method of claim 20 wherein both combining steps include multiplying the data from one of the groups by a predetermined coefficient to produce a product and selectively adding or subtracting the product from the data of the corresponding groups.

* * * * *

UNITED STATES PATENT AND TRADEMARK OFFICE
CERTIFICATE OF CORRECTION

PATENT NO. : 4,764,974

DATED : August 16, 1988

INVENTOR(S) : Richard E. Woods

It is certified that error appears in the above-identified patent and that said Letters Patent is hereby corrected as shown below:

Column 5, line 59, delete "33" and insert --32--,

Column 9, line 2, delete " - " and insert -- = --,

Column 11, line 12, delete $2_p$ in <u>both</u> instances in the example and insert --$2^P$--, Column 11, line 22, delete "$2_p$-1" and insert --$2^{P-1}$--, Column 11, line 37 delete "$2^2$-1" and insert --$2^{2-1}$--.

Signed and Sealed this

Thirty-first Day of January, 1989

*Attest:*

DONALD J. QUIGG

*Attesting Officer*     *Commissioner of Patents and Trademarks*